Sept. 30, 1952     C. W. CLAYTOR ET AL     2,612,276
UNLOADING MECHANISM FOR CONCRETE BLOCK MOLDING MACHINES
Filed Aug. 5, 1947     4 Sheets-Sheet 1
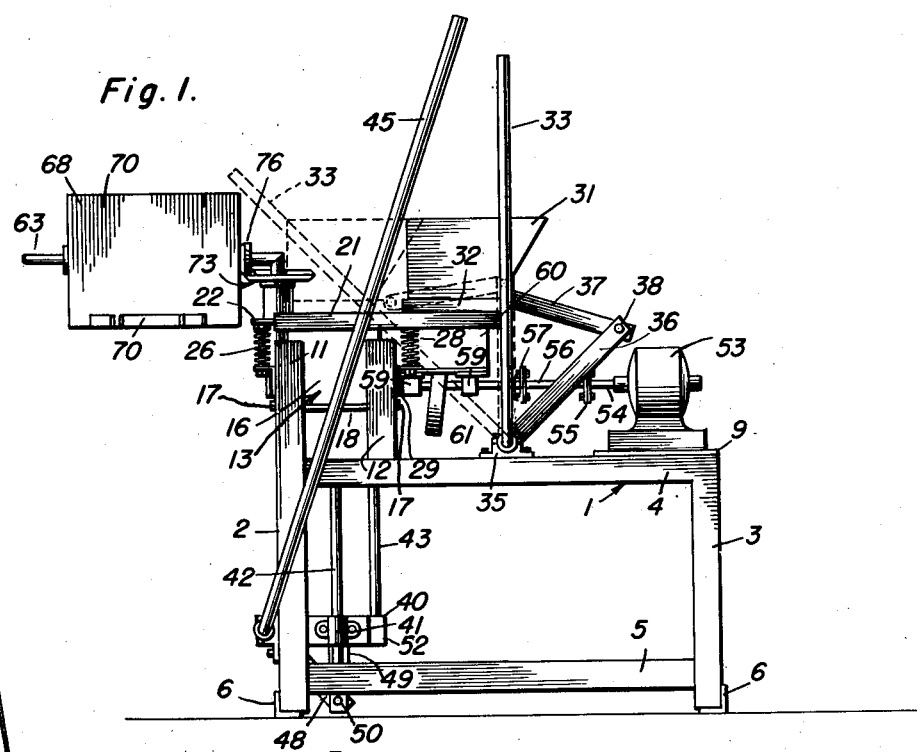
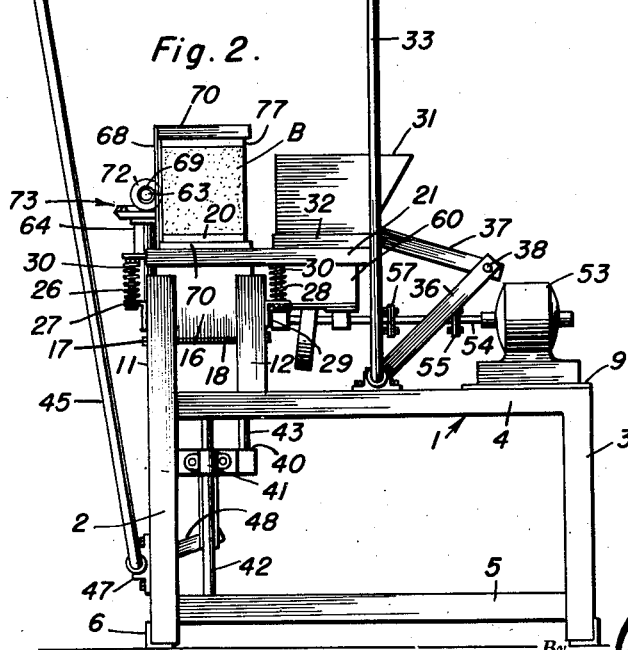
Inventors
Carl W. Claytor
John W. Hendricks
By *Clarence A. O'Brien and Harvey B. Jacobson*
Attorneys Sept. 30, 1952     C. W. CLAYTOR ET AL     2,612,276
UNLOADING MECHANISM FOR CONCRETE BLOCK MOLDING MACHINES
Filed Aug. 5, 1947     4 Sheets-Sheet 2
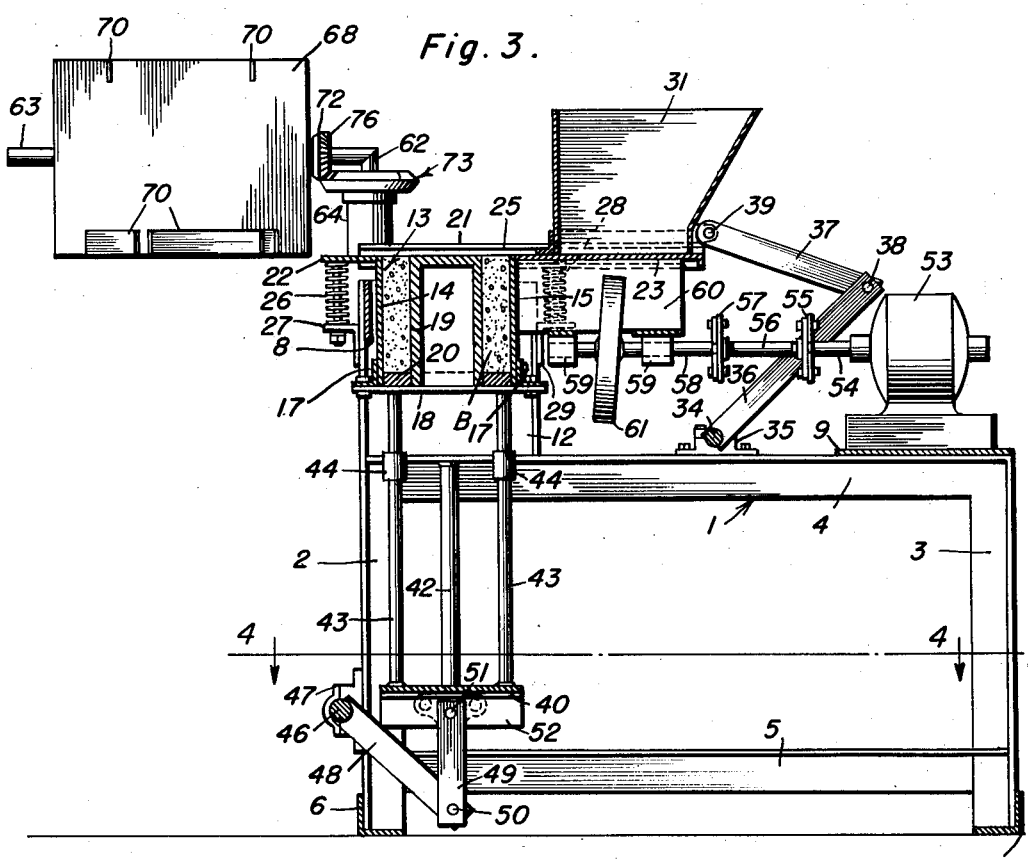
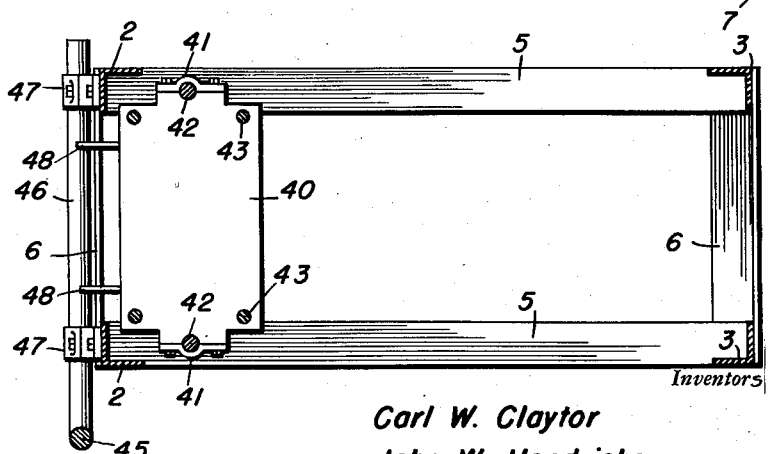
Inventors
Carl W. Claytor
John W. Hendricks
By *Clarence A. O'Brien and Harvey B. Jacobson*
Attorneys Sept. 30, 1952
C. W. CLAYTOR ET AL
2,612,276
UNLOADING MECHANISM FOR CONCRETE BLOCK MOLDING MACHINES
Filed Aug. 5, 1947
4 Sheets-Sheet 3
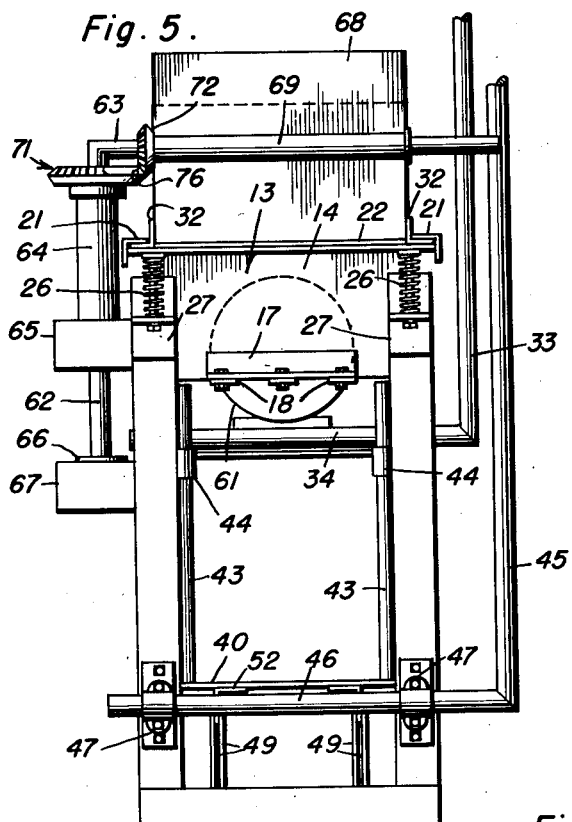
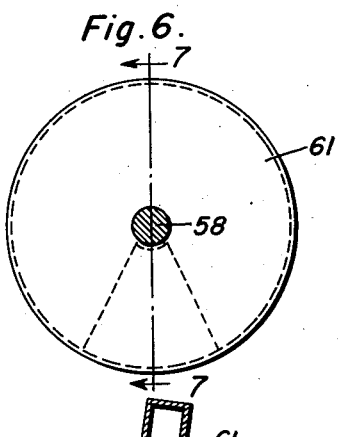
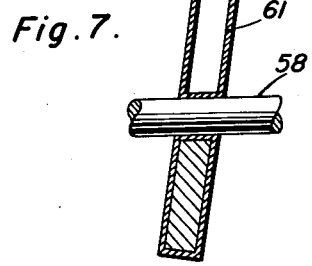
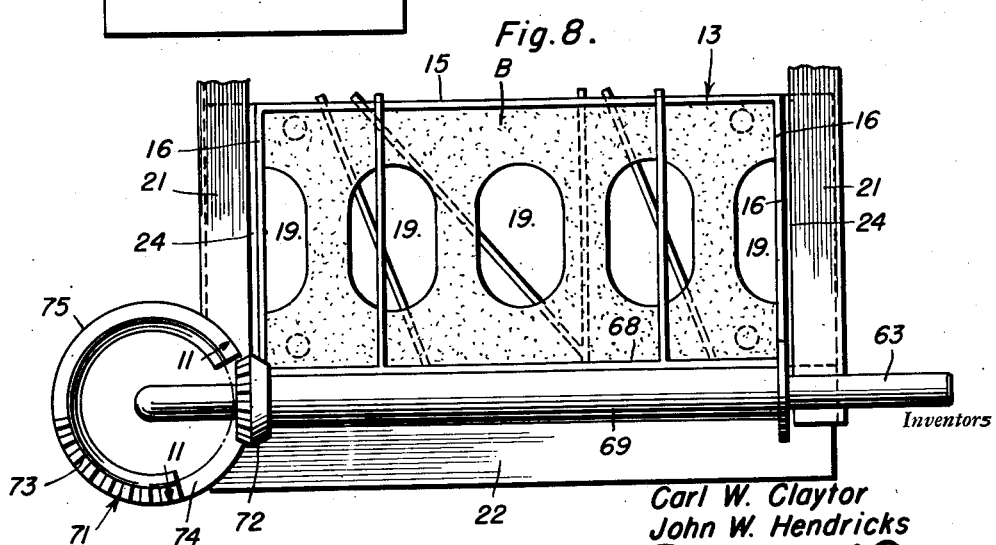
Inventors
Carl W. Claytor
John W. Hendricks
By *Clarence A. O'Brien
and Harvey B. Jacobson*
Attorneys Sept. 30, 1952     C. W. CLAYTOR ET AL     2,612,276
UNLOADING MECHANISM FOR CONCRETE BLOCK MOLDING MACHINES
Filed Aug. 5, 1947     4 Sheets—Sheet 4
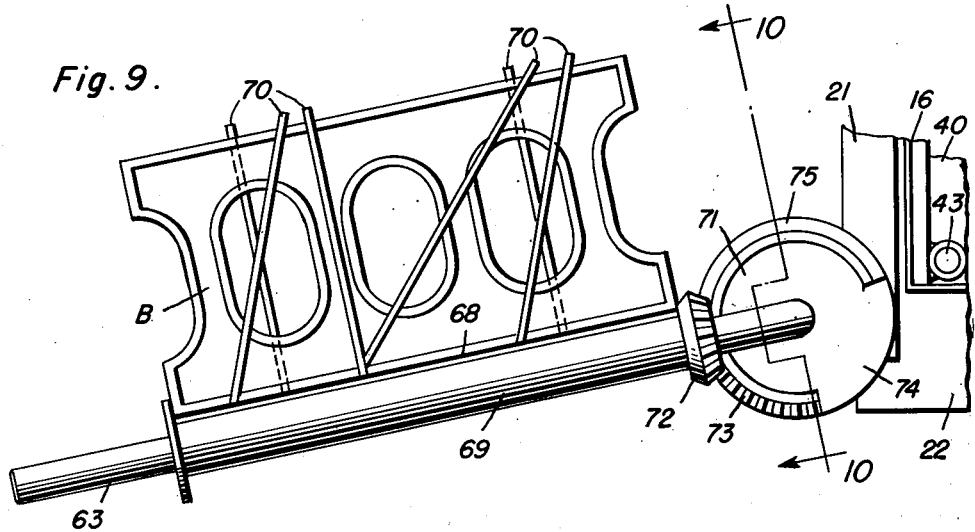
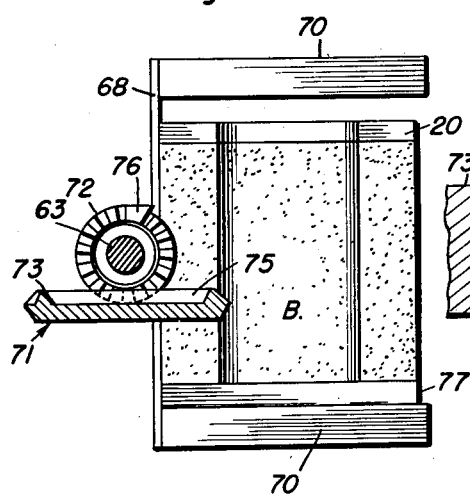
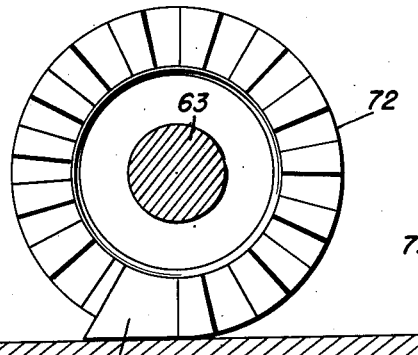
Inventors
Carl W. Claytor
John W. Hendricks
By *Clarence A. O'Brien and Harvey B. Jacobson*
Attorneys Patented Sept. 30, 1952

2,612,276

UNITED STATES PATENT OFFICE 2,612,276

UNLOADING MECHANISM FOR CONCRETE BLOCK MOLDING MACHINES

Carl W. Claytor and John W. Hendricks, Hartford, Ill.

Application August 5, 1947, Serial No. 766,400

3 Claims. (Cl. 214—1)

1

Our invention relates to improvements in machines for molding concrete blocks, such as are used for building purposes.

An object is to provide in a concrete block molding machine, improved means for stripping the mold box and unloading the molded blocks from the machine so as to expedite production and reduce manual labor.

Another object is to provide a machine adapted for the purpose above set forth which is safe, easy to operate, will not readily get out of order through wear, and is comparatively inexpensive to manufacture and use.

Other and subordinate objects, also comprehended by our invention, together with the precise nature of our improvements will be readily understood when the succeeding description and claims are read with reference to the drawings accompanying and forming part of this specification.

In the said drawings:

Figure 1 is a view in side elevation of our improved machine in a preferred embodiment thereof;

Figure 2 is a similar view with the stripping mechanism operated to strip the mold box, and the unloading mechanism positioned for loading of a molded block thereon;

Figure 3 is a view in vertical longitudinal section drawn to a larger scale and showing the mold box packed and the unloading mechanism operated to revolve the turntable clear of the mold box;

Figure 4 is a view in horizontal section taken on the line 4—4 of Figure 3;

Figure 5 is a view in front elevation drawn to the same scale as Figure 3;

Figure 6 is a view in side elevation of the wobbler wheel with the shaft thereof shown in section;

Figure 7 is a view in transverse section taken on the line 7—7 of Figure 6;

Figure 8 is a fragmentary view in plan illustrating the unloading mechanism with the turntable revolved into loading position, and the parts drawn to a further enlarged scale;

Figure 9 is a fragmentary view in plan showing the unloading mechanism operated to revolve the turntable into unloading position;

Figure 10 is a view in transverse section taken on the line 10—10 of Figure 9; and Figure 11 is a detail view in section taken on the line 11—11 of Figure 8 and drawn to a larger scale.

Referring to the drawings by numerals, our

2 improved molding machine, in the illustrated, preferred embodiment thereof, comprises a skeleton base frame 1 of generally rectangular form with front and rear pairs of corner legs 2, 3, upper and lower pairs of side rails 4, 5, and front and rear cross bars 6, 7, connecting the lower ends of the front and rear pairs of legs 2, 3. Preferably the base frame 1 as regards the parts described is formed of angle iron. The front pairs of legs 2 extend upwardly above the upper pair of side rails 4 and are connected at the upper ends thereof by a cross plate 8. A platform 9 is supported by the upper pair of side rails 4 at the rear ends thereof. A pair of angle iron bars arise from the upper pair of side rails 4, intermediate the platform 9 and the front pair of legs 2, and form with the portions of the front pair of legs 2 extending above the side rails 4, front and rear mounting posts 11, 12 at the corners of a mold box 13 now to be described.

The mold box 13 is of rectangular form and open at its top and bottom, with front and rear sides 14, 15 and ends 16. A pair of angle iron brace bars 17 extend along the lower edges of the sides 14, 15, on the outside thereof, and to which are suitably attached cross bars 18 extending across the bottom of the mold box 13 and supporting cores 19 extending upwardly therefrom into said mold box. A platen 20 is removably fitted in the mold box 13 to rest on the cross bars 18.

The mold box 13 is suspended for vibratory movement between the front and rear pairs of posts 11, 12 by the following means. A pair of angle iron guide bars 21 extend horizontally along the ends 16 of the mold box 13 adjacent the upper edges of said ends and project rearwardly of said box a distance suitable for a purpose presently seen. A cross bar 22 connects the front ends of the guide bars 21, and in the rear of the mold box 13 a bed plate 23 connects said bars 21 for a purpose presently seen. The upper side edges of the mold box 13 are fitted between and suitably secured to the cross bar 22 and the bed plate 23. End upper edge flanges 24 on the mold box 13 are suitably secured to the angle iron guide bars 21. The bed plate 23 and the top of the mold box 13 form with the angle iron guide bars 21 horizontal guideways 25 above the mold box 13 for a purpose to be explained. Coil springs 26 at the front of the mold box 13, adjacent opposite ends thereof, and which are interposed between the cross bar 22 and the angle brackets 27 on the front pair of posts 11, and similar springs 28 at the rear of said box interposed between the angle iron guide bars 21 and angle brackets 29 on the pair of rear posts 12 yieldingly support the mold box 13, together with the angle iron guide bars 21 and the bar 22 and bed plate 23 so that these parts may vibrate vertically. Guide bolts 30 slidably depend from the cross bar 20 and said guide bars 21 through the springs 26, 28 and angle brackets 27, 29 and guide the mold box 13 for vertical vibratory movement.

A hopper 31 for feeding cement, or concrete, mix into the mold box 13 is slidably mounted in the guideways 25 by means of side angle iron bars 32 suitably secured to the bottom side edges of said hopper. The hopper 31 is slidable forwardly from a retracted position to an advanced dumping position in which the bottom of the same registers with the top of the mold box 13. In the retracted position of said hopper 31, the bottom thereof is closed by the bed plate 23.

Means are provided for advancing and retracting the hopper 31 comprising an upstanding hand lever 33 on one end of a rock shaft 34 extending across the frame 1 and journaled in bearings 35 on the pair of upper side rails 4 intermediate the platform 9 and the rear posts 12. A pair of crank arms 36 extend upwardly from said rock shaft 34 adjacent opposite ends thereof and which are operatively connected to said hopper 31 by a pair of links 37 pivoted at corresponding ends thereof, as at 38, to the upper ends of said crank arms 36 with the opposite ends of the same pivoted, as at 39, to said hopper 31 at opposite sides thereof.

Stripper mechanism is provided for elevating the platen 20 out of the mold box 13 to a position immediately above said box to strip said box of a molded block B. The stripper mechanism preferably comprises a substantially rectangular, vertically movable, presser plate 40 extending across the front end of the frame 1 between the upper and lower pairs of side rails 4, 5, with ends slidably mounted, by bearings 41, on vertical guide rods 42 suitably fixed at the ends thereof in the upper and lower side rails 4, 5 at opposite sides of the frame 1. Corner thrust rods 43 extend upwardly from the presser plate 40 and are slidable in guide sleeves 44 on the upper side rails 4 so that the upper ends of said rods are adapted to be thrust against the bottom of the platen 20, at the corners thereof, when said presser plate 40 is moved upwardly from a normally lowered position. For moving the presser plate 40 upwardly, an upstanding hand lever 45 is provided on one end of a rock shaft 46 extending across the front legs 2 and journaled in bearings 47 thereon. A pair of crank arms 48 extend laterally from said rock shaft 46, beneath said plate 40, adjacent opposite ends of said plate. Pairs of vertical links 49 with corresponding ends pivoted, as at 50, to the crank arms 48, and the other ends thereof pivoted, as at 51, to bottom cross bars 52 on said plate 40 connect said crank arms 48 to the presser plate 40 so that by rocking of the rock shaft 46 in opposite directions, said presser plate 40 may be raised and lowered to correspondingly move the thrust rods 43.

As will be clear from the foregoing, the mold box 13 and the hopper 31 are mounted by the springs 26, 28 for vibration vertically in unison and the described means for advancing and retracting the hopper 31 is adapted for compensating movement to permit such vibration of said box and hopper, since the axes of movement of the rock shaft 34, crank arms 36 and links 37 are transverse to the direction of vibration.

For vibrating the mold box 13 and hopper 31, an electric motor 53, adapted for operation and control in any suitable manner, is suitably fixed on the platform 9 with its armature shaft 54 extending forwardly in the longitudinal center of the frame 1 below the bed plate 23 and operatively connected by a universal joint 55 to a motion transmitting shaft 56 similarly connected, by a second universal joint 57, to the rear end of a driven shaft 58 extending longitudinally of the frame 1 beneath the bed plate 23 and journaled in a pair of bearings 59 extending across the bottom edges of a pair of channel iron sections 60 depending from and suitably fixed to the bed plate 23 upon opposite sides of the longitudinal center of the hopper 31 and the transverse center of the mold box 13. A counterweighted wobbler wheel 61 is suitably fixed on the driven shaft 58 to rotate between the beam sections 60 and the pair of bearings 59.

At the front of the frame 1, mechanism is provided for unloading a molded block B after the mold box 13 has been stripped thereof. This mechanism comprises, as its basic element, an upright shaft 62 with a right angled upper end crank arm 63, and which is journaled in upright position in a bearing sleeve 64 at one front corner of the frame 1 and upstanding from a lateral arm 65 on said frame 1 through which said shaft 62 depends and rests upon a bearing plate 66 supported by a lateral arm 67 also on said frame 1, the arrangement being such that the shaft 62 is rotatable in said sleeve 64 to permit the crank arm 63 to be revolved horizontally. An elongated, rectangular turntable 68 is rotatably mounted on the crank arm 63 by means of a sleeve 69 suitably confined on said crank arm against endwise movement thereon and which extends along the turntable 68 in the longitutinal center of the same and is suitably fixed thereto. Block supporting fingers 70 extend, at substantially right angles, from one and the same side face of the turntable 68 and along opposite side edges of the same, said series of fingers 70 being adapted to straddle the platen 20 and a molded block B thereon elevated above the mold box 13 by the described stripper mechanism.

The crank arm 63 is adapted to be revolved in one direction manually into overlying, substantially parallel relation, to the front edge of the mold box 13 to revolve the turntable 68 and the fingers 70 into a loading position, and said crank arm is also revoluble from the position described through an angle of substantially 170° to revolve said turntable 68 and fingers 70 into unloading position in which said crank arm and turntable extend from one side of the frame 1 for convenient unloading of a block B. In either of these two positions, the turntable 68 is disposed in a vertical plane with the fingers 70 disposed horizontally and rearwardly of the same, and gearing is provided for causing said turntable 68 to rotate about said crank arm 63 through an angle of 180° while the same is being swung, or revolved, from loading to unloading position so as to invert said turntable and the fingers 70 for a purpose to be seen. The gearing, above mentioned, comprises a relatively large mutilated bevel gear 71 fixed on the upper end of the bearing sleeve 64 concentrically thereof, and a relatively smaller mutilated bevel gear 72 fast on one end of the bearing sleeve 69 and adapted to mesh with the fixed gear 71. The fixed gear 71 comprises a raised toothed sector 73, a flat, lower sector 74 at one end of said sector 73, and a raised beveled, plain sector 75 at the other end of said sector 73 for stopping rotation of the bevel gear 72 at said other end of the toothed sector 73. The bevel gear 73 includes, on the toothed part thereof, a flat faced radial stop lug 76 adapted to engage the lower flat sector 74 slidably when the bevel gear 72 rides off the adjacent end of the toothed sector 73 and thereby lock the sleeve 69 and turntable 68 and fingers 70 against rotation on the crank arm 63.

The use and operation of the machine will now be described. The hopper 31 being filled and the turntable 68 clear of the mold box 13, for instance as shown in Figures 1 and 3, said hopper 31 is advanced by operation of the hopper advancing and retracting mechanism to position said hopper over the mold box 13 and thereby dump the contents of said hopper into said mold box. In this operation, the hand lever 33 is swung counter-clockwise, as viewed in Figures 1 and 2, to correspondingly rock the rock shaft 34 and swing the crank arms 36 counter-clockwise, thus causing the links 37 to slide the hopper 31 forwardly in the guideways 25. After the mold box 13 has thus been filled, the hopper 31 is retracted, through swinging of the hand lever 33 clockwise, with resulting operation of the rock shaft 34, crank arms 36 and links 37, in a manner which will be understood. Retraction of the hopper 31 scrapes the contents of the mold box 13 level with the top of said box and initially packs the same. The hopper 31 may now be filled if desired.

After the mold box 13 has been filled and the hopper 31 retracted, the motor 53 may be started which causes the wobbler wheel 68 to rotate at a high rate of speed, thereby vibrating the mold box 13 and the hopper 31 on the springs 26, 28 to pack the contents thereof. Thus, material in the hopper 31 may be densely packed in the hopper before being loaded into the mold box 13 for repacking.

When the contents of the mold box 13 has been sufficiently packed, the motor 53 may be stopped to stop further vibration of the mold box 13 and hopper 31, and the described stripper mechanism operated, after the contents of the mold box 13 has been set to form the block B. In operating the stripper mechanism, the hand lever 45 is swung counter-clockwise from the position shown in Figure 1 to that shown in Figure 2. This rocks the rock shaft 46 counter-clockwise to correspondingly swing the crank arms 48 which, through the links 49, move the presser plate upwardly on the guide rods 42 thereby thrusting the thrust rods 43 against the bottom of the platen 20 until said rods have stripped the mold box 13 by raising said platen 20 with the molded block B thereon slightly above the top of said mold box. The hand lever 43 is held to hold the platen 20 in this raised position with the molded block B elevated thereby, preparatory to operating the unloading mechanism.

With the mold box 13 stripped, as above set forth, the described unloading mechanism is operated as follows: The crank arm 63 is revolved, counter-clockwise as viewed in Figures 8 and 9, to locate the same substantially alongside and parallel with the front edge of the mold box 13, as shown for instance in Figures 2 and 8. In this operation of said crank arm 63, the bevel gear 72 is first rotated, by meshing with the toothed sector 73, to rotate the sleeve 69 and thereby rotate the turntable 68 and fingers 70 until said turntable is vertical and the fingers 70 horizontal and facing the mold box 13. At this point, the bevel gear 72 rides off the toothed sector 73 and revolves the lug 73 into flat engagement with the lower flat sector 74, whereby the turntable 68 and fingers 70 are locked in a position for loading, further revolving of said crank arm 63 in the same direction positions the fingers 70 into straddling relation to the platen 20 and the block B, as shown in Figure 2. At this point, the described stripper mechanism may be operated reversely, in a manner which will be clear, to lower the platen 20 with the block B thereon onto the lowermost fingers 70, thus loading the block B onto the turntable, as shown for instance in Figure 10. An extra platen 77 may then be placed on top of the block B between the same and the uppermost fingers 70. The crank arm 63 may next be revolved clockwise, as viewed in Figures 8 and 9, through an angle of substantially 170° and into substantially the position shown in Figure 9. Such revolving of said crank arm 63 causes the bevel gear 72 to mesh with the toothed sector 73 whereby the sleeve 69 is rotated about said crank arm 63 so as to rotate and invert the turntable 68 and fingers 70, also the platens 20, and 77, and block B, so that said block rests on the extra platen 77 and the platen 20 belonging in the mold box 13 may be removed for use again in said mold box. As the turntable 68 and fingers 70, together with the platens 20, 77, and the block B are thus inverted, the crank arm 77 is brought to rest by engagement of the teeth of the bevel gear 72 with the plain bevel sector 75 and rotation of the sleeve 79 is stopped so as to hold the turntable 68, fingers 70, platen 77 and block B in inverted position at one side of the frame 1, in which position the platen 77 with the block B thereon may be removed from the then lowermost fingers 70 for disposal as desired.

The foregoing will, it is believed, suffice to impart a clear understanding of our invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a concrete block machine of the class operative for elevating a molded block on a platen out of and above a mold, unloading mechanism for said block and platen comprising a horizontal arm pivotally mounted on the machine for revolving about a vertical axis, a turntable carried by said arm for revolving thereby into a loading position opposite said platen and mold and into an unloading position, means on said turntable for straddling said block and platen to pick up the same when the turntable is revolved into loading position, said turntable being rotatable on said arm to invert said block and platen and position the platen uppermost, and drive means for rotating said turntable rendered operative by revolving said turntable from loading to unloading position comprising mutilated gearing idling during initial revolving of said turntable toward unloading position.

2. In a concrete block machine of the class operative for elevating a molded block on a platen out of and above a mold, unloading mechanism for said block and platen comprising a horizontal arm pivotally mounted on the machine for revolving about a vertical axis, a turntable carried by said arm for revolving thereby into a loading position opposite said platen and mold and into an unloading position, means on said turntable for straddling said block and platen to pick up the same when the turntable is revolved into loading position, said turntable being rotatable on said arm to invert said block and platen and position the platen uppermost, and drive means for rotating said turntable rendered operative by revolving said turntable from loading to unloading position comprising mutilated gears coacting to lock said turntable against rotation in said unloading position thereof.

3. In a concrete block machine of the class operative for elevating a molded block on a platen out of and above a mold, unloading mechanism for said block and platen comprising a horizontal arm pivotally mounted on the machine for revolving about a vertical axis, a turntable carried by said arm for revolving thereby into a loading position opposite said platen and mold and into an unloading position, means on said turntable for straddling said block and platen to pick up the same when the turntable is revolved into loading position, said turntable being rotatable on said arm to invert said block and platen and position the platen uppermost, and drive means for rotating said turntable rendered operative by revolving said turntable from loading to unloading position comprising a pair of mutilated gears coacting to lock said turntable against rotation in the loading and unloading positions thereof one of said gears having a part slidably engaging and revolving on the other to lock said turntable against rotation in the loading position of said turntable.

CARL W. CLAYTOR.
JOHN W. HENDRICKS.

REFERENCES CITED

The following references are of record in the file of this patent:

UNITED STATES PATENTS

| Number | Name | Date |
|---|---|---|
| 2,054,253 | Horsch | Sept. 15, 1936 |
| 2,069,880 | Gelbman et al. | Feb. 9, 1937 |
| 2,193,879 | Muenzer | Mar. 19, 1940 |
| 2,231,064 | Fearn | Feb. 11, 1941 |
| 2,303,884 | Krehbiel et al. | Dec. 1, 1942 |
| 2,389,673 | Lofdahl | Nov. 27, 1945 |
| 2,396,999 | George | Mar. 19, 1946 |
| 2,528,931 | White | Nov. 7, 1950 |
| 2,529,066 | Annas | Nov. 7, 1950 |